Patented Apr. 18, 1939

2,155,141

UNITED STATES PATENT OFFICE 2,155,141

EMULSIFYING AGENTS AND PROCESS OF MAKING SAME

Cornelis Maters, Rotterdam, and Martinus Johannes Riemersma, Wassenaar, Netherlands, assignors to Hercules Powder Company, Wilmington, Del., a corporation of Delaware No Drawing. Application May 4, 1936, Serial No. 77,829

5 Claims. (Cl. 252—1)

This invention relates to improvements in emulsifying agents, and more particularly to emulsifying agents adapted for use in the preparation of stable bitumen emulsions, e. g. asphalt emulsions.

Heretofore, bitumen emulsions have been prepared by the use of aqueous rosin soap solutions, but such bitumen emulsions have been characterized by having little stability, and tendency to break down into their components in a comparatively short time or by the addition of electrolytes. Bitumen emulsions have also been prepared heretofore by the use of aqueous solutions of saponified oxidized resins and oxidized rosin obtained from the furfural refining of gasoline solutions of rosin, obtained by the gasoline extraction of resinous wood, without, however, accomplishing the desired result of rendering the bitumen emulsions made therewith stable over long periods of time and stable against the addition of electrolytes.

In accordance with our invention, a product having superior emulsifying properties is prepared by the treatment with an excess of caustic alkali solution, e. g. sodium or potassium hydroxide of a product of the refining of wood rosin. This product of the refining of wood rosin has not yet been analyzed completely to determine its exact constitution, on account of its extreme chemical complexity. We have, however, determined that such resinous product has a methoxy content of about 3 to 6%, and contains, among other things, various oxidized resin acids, oxidized terpenes, polyphenols, polymerized terpenes, and complex ligneous substances, but since its exact composition is so far unknown, we shall hereinafter define such resin by its method of preparation.

In one method of preparing our resin, later to be saponified by caustic alkali to form our improved emulsifying agent, pine wood, preferably that from the southern long leaf pine, with or without preliminary steaming to remove therefrom turpentine and pine oil, is extracted with a solvent which is a solvent for the wood rosin, turpentine, and pine oil contained in the pine wood chips, and which is also a solvent for other complex substances contained in the pine wood chips. Such a solvent may be, for example, a coal tar hydrocarbon, such as benzene, toluene, xylene, etc. The extraction of the wood chips may be accomplished by flooding the chips with the solvent, with or without the use of heat.

When the extraction of the wood chips has been sufficient, the coal tar hydrocarbon solution of matter extracted from the chips is drawn off the chips and the solvent evaporated and reused in the process, if desired. Evaporation of the solvent leaves turpentine, pine oil, rosin, and the resin the object of this invention. The turpentine and pine oil are then removed by distillation, leaving a dark colored resin comprising a mixture of FF wood rosin and the resin which is the object of this invention. This resinous mixture is then extracted with a substance which is a solvent for the FF rosin but not a solvent for the other resin present in the mixture. As such solvent we may use, for example, and preferably at an elevated temperature, petroleum hydrocarbons such as petroleum ether, gasoline, heptane, hexane, etc., or an operaole equivalent therefor.

When the mixture of resinous materials has been sufficiently extracted by the petroleum hydrocarbon, a dark colored, resinous substance remains, which, when freed from occluded gasoline or other petroleum hydrocarbon, is the resin we use in the preparation of our improved emulsifying agent. Such a resin is characterized by a methoxy content of about 3 to 6%, naphtha-insoluble matter about 98%, melting point about 115° C., by the drop method, and acid number 100.

We then saponify, preferably with the use of heat, the resin, prepared, for example, as above, by the use of aqueous potassium hydroxide containing, for example, 8 to 18% potassium hydroxide, based on the resin used. Such saponified resin solutions will contain, for example, 45 to 55% water and from 0 to 5% free caustic potash. These improved emulsifying agents may be used to advantage in the preparation of bitumen emulsions which are not subject to precipitation on addition of water-containing electrolytes. As an example of such improved bitumen emulsions, asphalt emulsions containing rosin soap, and asphalt emulsions containing our improved emulsifying agent, designated in the following table as "resin soap", were prepared and subjected to the demulsibility test.

| | Percent by weight | Percent alkali added * | Percent asphalt content | Percent demulsibility | |
|---|---|---|---|---|---|
| | | | | a | b |
| Resin soap | 3 | 0.2 | 65 | Nil | Nil |
| Do | 3 | 0.6 | 65 | Nil | Nil |
| Do | 3 | 1.0 | 65 | Nil | Nil |
| Do | 2 | 0.5 | 65 | 8% | 90% |
| Do | 2 | 0.5 | 65 | Nil | Nil |

* At time of making the emulsion.

The demulsibility tests were made as follows:

(a) To 100 g. of asphalt emulsion add 35 cc. of 0.02 normal calcium chloride solution, with stirring, during 2 minutes, wash the residue through a 20 mesh sieve, and weigh the residue. The ratio of residue remaining, to the asphalt content of the emulsion, is the per cent. demulsibility.

(b) To 100 g. of asphalt emulsion add 50 cc. of 0.1 normal calcium chloride solution, with stirring, during 2 minutes, wash the residue through a 20 mesh sieve, and weigh the residue. The ratio of residue remaining, to the asphalt content of the emulsion, is the per cent. demulsibility.

Thus, by the use of our improved emulsifying agent we are able to prepare asphalt emulsions stable to electrolytes, e. g. to calcium chloride solutions, as used in the standard test.

We do not limit our new emulsifying agent to use with bitumens, to produce bitumen or asphalt emulsions, but may use the same in any connection where a stable emulsion is desired. For example, we may use our improved emulsifying agent in the preparation of stable emulsions of petroleum oils, vegetable oils, waxes, nitrocellulose solutions, etc.

What we desire to claim and protect by Letters Patent is:

1. Process of manufacture of an emulsifying agent comprising saponifying with an aqueous alkali metal hydroxide the resin obtained by extracting pine wood with a coal tar hydrocarbon, removing volatile substances from said extract, and removing wood rosin from the remaining solid resinous mixtures by extraction with a petroleum hydrocarbon said resin being also characterized by having a methoxy content of about 3% to about 6%, naphtha-insoluble matter about 98%, melting point about 115° C. and acid number about 100.

2. Process of manufacture of an emulsifying agent comprising saponifying with an excess of an aqueous alkali metal hydroxide the resin obtained by extracting pine wood chips with a coal tar hydrocarbon, removing volatile substances from said extract, and removing wood rosin from the remaining solid resinous mixture by extraction with a petroleum hydrocarbon said resin being also characterized by having a methoxy content of about 3% to about 6%, naphtha-insoluble matter about 98%, melting point about 115° C. and acid number about 100.

3. An emulsifying agent comprising the reaction product of an aqueous alkali metal hydroxide and a resin obtained by extracting pine wood by a coal tar hydrocarbon, removing volatile substances from the extract and extracting the non-volatile residue with a petroleum hydrocarbon said resin being also characterized by having a methoxy content of about 3% to about 6%, naphtha-insoluble matter about 98%, melting point about 115° C. and acid number about 100.

4. An emulsifying agent comprising the reaction product of an aqueous alkali metal hydroxide and a resin obtained by extracting pine wood by a coal tar hydrocarbon, removing volatile substances from the extract and removing wood rosin from the non-volatile residue by extraction with petroleum hydrocarbon said resin being also characterized by having a methoxy content of about 3% to about 6%, naphtha-insoluble matter about 98%, melting point about 115° C. and acid number about 100.

5. As an emulsifying agent the reaction product of an aqueous alkali metal hydroxide and a resin characterized by a methoxy content of about 3-6% and naphtha-insoluble matter about 98% melting point about 115° C. and acid number about 100.

CORNELIS MATERS.
MARTINUS JOHANNES RIEMERSMA.

CERTIFICATE OF CORRECTION.

Patent No. 2,155,141.　　　　　　　　　　　April 18, 1939.

CORNELIS MATERS, ET AL.

It is hereby certified that error appears in the printed specification of the above numbered patent requiring correction as follows: Page 1, second column, line 11, for "operaole" read operable; lines 41 to 51, in the table, left hand column thereof, for "Resin soap.......　　　　　　　Resin soap.......
Do............　　　　　　　Do............
Do............　　read　　Do............
Do............　　　　　　　Rosin soap.......
Do............"　　　　　　　Resin soap.......;

and that the said Letters Patent should be read with this correction therein that the same may conform to the record of the case in the Patent Office.

Signed and sealed this 8th day of August, A. D. 1939.

(Seal)　　　　　　　　　　　　　　　　　Leslie Frazer,
　　　　　　　　　　　　　　　　Acting Commissioner of Patents.